United States Patent [19]

Wilson

[11] Patent Number: 4,566,188

[45] Date of Patent: Jan. 28, 1986

[54] POWER SAW PRUNING DEVICE

[76] Inventor: Teck A. Wilson, Seminole Point Rd., Fairplay, S.C. 29643

[21] Appl. No.: 630,106

[22] Filed: Jul. 12, 1984

[51] Int. Cl.$^4$ .............................................. B27B 19/09
[52] U.S. Cl. ................................... 30/166 A; 30/122; 30/372; 83/745
[58] Field of Search ................... 30/166 R, 166 A, 371, 30/392, 393, 394, 122; 83/744, 745, 743

[56] References Cited

U.S. PATENT DOCUMENTS

| | | | |
|---|---|---|---|
| 728,069 | 5/1903 | Young | 30/166 A |
| 2,608,220 | 8/1952 | Cauthen | 83/745 |
| 2,974,694 | 3/1961 | Mattila | 83/745 X |
| 3,755,896 | 9/1973 | Tommerup | 83/743 X |

*Primary Examiner*—Jimmy C. Peters
*Attorney, Agent, or Firm*—Cort Flint

[57] ABSTRACT

A power saw pruning device (A) is disclosed which utilizes a conventional saber saw (14) for pruning trees. The device includes an elongated pole handle (10) and a base adaptor (12) carried on one end of the elongated pole handle. The base (12) includes a rack (16, 18) in which a shoe (20) of the saber saw slides in opposing directions in one dimension. An elongated slot (26) is formed in the base (12) for receiving a blade (28) of the saber saw therethrough. Angle arm means (B) includes an angle edge (44) which tapers from an open mouth (46) to the base (12) for gripping a tree limb (40) therein. The plane of the angle arm (42) is offset relative to the plane of the blade (28). By hanging the device on a tree limb to be cut, an operator may move to a remote position and operate the power saw by a switch (32). After the tree limb is cut through, the device remains suspended on a stump (40a) of the tree limb which has been cut. After the limb has fallen to the ground the operator may remove the device from the stump (40a).

22 Claims, 4 Drawing Figures

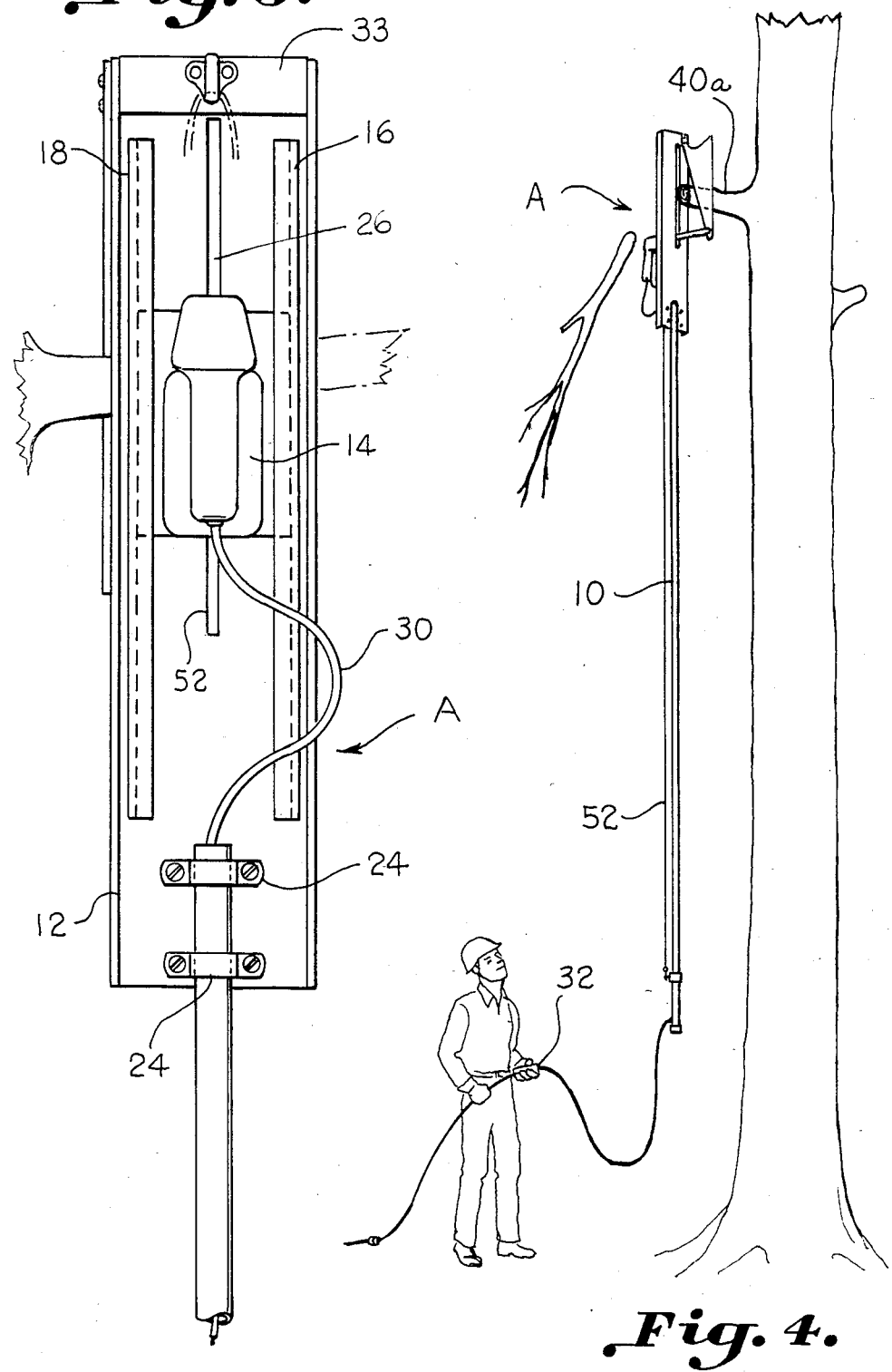

POWER SAW PRUNING DEVICE

BACKGROUND OF THE INVENTION

The invention relates to a safe and reliable electrically powered pruning saw to trim and cut limbs overhead. Manual pole saws with a saw blade can be used, with some difficulty, to cut small limbs from ten to fifteen feet above the ground. Over fifteen feet or so above the ground, pruning normally requires the use of ladders or climbing the tree. Powered pole saws using a circular saw blade at the top of the pole, with a motor at the bottom and a belt or a long shaft power transmission have been proposed, but they are heavy, expensive, and difficult to maneuver and control. For these reasons, this type of saw has proven dangerous to use.

Various pruning devices are shown in U.S. Pat. No. 3,755,896 wherein a device is disclosed for holding a tree limb while a manual saw is used for cutting the tree limb; U.S. Pat. No. 1,224,194 discloses a manual saw having a jaw for holding the tree limb; U.S. Pat. No. 2,881,519 discloses a power pruning saw; U.S. Pat. No. 3,715,805 discloses a power pruning saw and end supports which hold the limb in contact with the saw; and U.S. Pat. No. 2,814,871 discloses a manual saw for pruning a tree limb having a hook for gripping the tree limb as the saw blade is manually reciprocated. However, it will be observed that the above differs substantially in concept and structure from the simplified device of the present invention.

Another shortcoming of previous pruning devices is that the operator need be in close proximity to the limb while it is being cut which presents the danger that the operator will misjudge the cut and the tree limb will fall before the operator has the chance to get out of the way.

Accordingly, an important object of the present invention is to provide a safe reliable power tree limb pruning device.

Another important object of the present invention is to provide a power tree pruning device which can be operated while the operator is remote from the device.

Still another important object of the present invention is to provide an accessory device which may be utilized with a power saw for converting the power saw into a pruning device in a safe reliable manner.

Still another important object of the present invention is to provide a power tree pruning device which can be suspended from a limb and the tree limb be cut automatically while the operator is in a remote location with the tree pruning device remaining suspended on the stump of the cut limb.

SUMMARY OF THE INVENTION

The above objectives are accomplished according to the present invention by providing a pruning device having an elongated handle and an adaptor base carried adjacent one end of the handle having a rack for slidably carrying a power saw. An offset angle arm is provided which is offset with respect to the saw blade. With the angle arm placed closest to the tree, the saw blade cuts through the tree limb while the angle arm grips a stump of the cut limb to retain the pruning device in a suspended configuration from the stump after the tree limb has fallen. In this manner, the operator may hang the pruning device over the tree limb and remove himself from the device to a position where he is safe. The device may then be turned on and the tree limb cut whereafter the device will remain suspended upon the stump of the cut tree limb until it is safe for the operator to return and remove the trimming device.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein:

FIG. 3 is a top plan view of a power tree pruning device according to the invention in a cutting position suspended from a tree limb; and FIG. 4 is a perspective view illustrating a power tree pruning device according to the invention in a suspended position following cutting of a tree limb.

DESCRIPTION OF A PREFERRED EMBODIMENT

Figure 1:
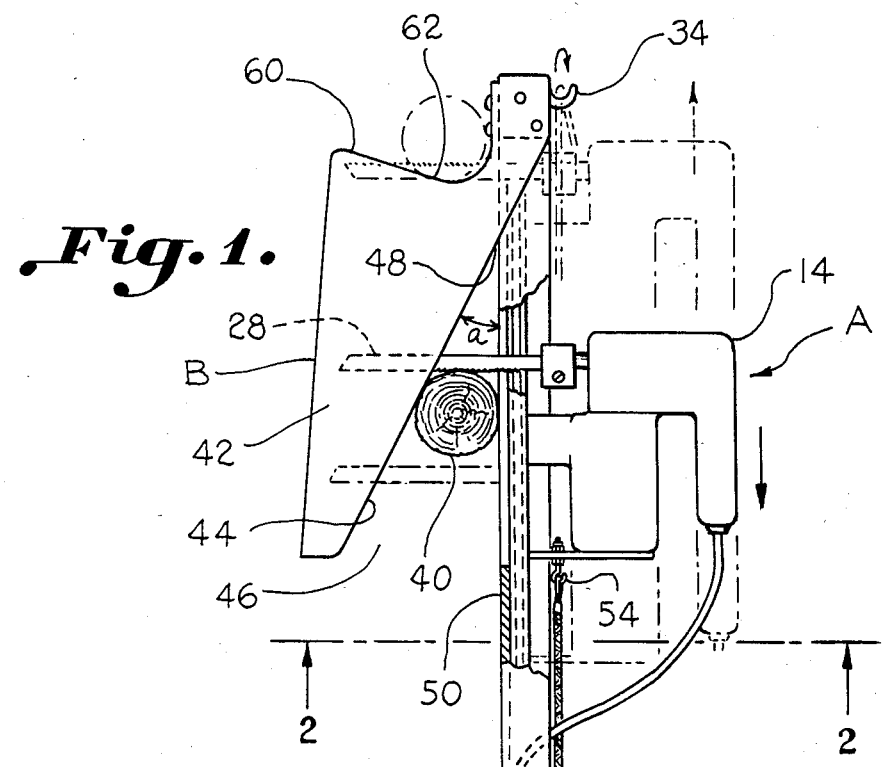
FIG. 1 is an elevation illustrating a power tree pruning device constructed according to the present invention.

The invention is directed to a power tree pruning device which incorporates a conventional reciprocating saber saw with its blade reversed mounted for cutting tree limbs high overhead while the operator is a safe distance from the cutting operation in a reliable manner.

Referring now in more detail to the drawings, a tree pruning device designated generally as A is illustrated which includes an elongated pole handle 10 which may be extensible or expandable in any conventional manner such as a telescoping hollow pole. On one end of the pole handle 10 is carried a base means 12 which is adapted for slidably carrying a conventional saber saw 14. For this purpose, the base means 12 includes rack means for slidably carrying the saber saw in one dimension consisting of a pair of tracks 16 and 18. Each track includes a U-shaped channel member in which a shoe 20 of the saber saw 14 is slidably received. In the alternative, the tracks 16 and 18 may include L-shaped flanges wherein a leg of the L extends overlaps the flat metal shoe of the saber saw to retain it on the base. The tracks may be secured to the base 12 by any suitable means such as welding or by screws, or the base and rack may be extruded or otherwise fabricated as a single piece. The base 12 is fastened to the pole by means of a pair of C-shaped clamps 24 which clamp the base to the end of the elongated pole handle.

An elongated slot 26 is formed in the base means 12 which provides a means by which a blade 28 of the saber saw extends through and away from the base means in one direction. A power cord 30 from the saber saw extends through the hollow elongated pole handle 10 and exits at a lower end of the pole handle 10. The power cord continues at a sufficient distance from the end of the pole handle 10. A switch 32 may be provided for remote operation by the operator in a manner to be more fully described.

The saber saw 14 will stay in the guide slots of the tracks 16 and 18 and cannot slide past the ends of the slot 26 because of block 33. The saw may be slid out of the other end if the pole and clamps 24 are removed. A catch 34 is carried on the block 33.

Angle arm means B is provided for gripping a tree limb 40 to be cut and suspending the pruning device A during both the cutting operations and thereafter so that the device may be remotely controlled for safety. For this purpose, arm means B includes an angle arm or winged extension 42 for gripping the tree limb 40. The angle arm has a tapering edge 44 which is tapered from an open mouth 46 which forms an acute angle "a" with the base 12. The tapering edge 44 forms a tapering crevice 48 with base 12 in which a tree limb is hooked between the edge 44 and the rear side 50 of the base 12 depending on the diameter of the tree limb. It is noted that the edge 44 is narrow so that variations in the slope of the tree limb will not appreciably affect the hooking action of the angle arm 42.

Figure 2:
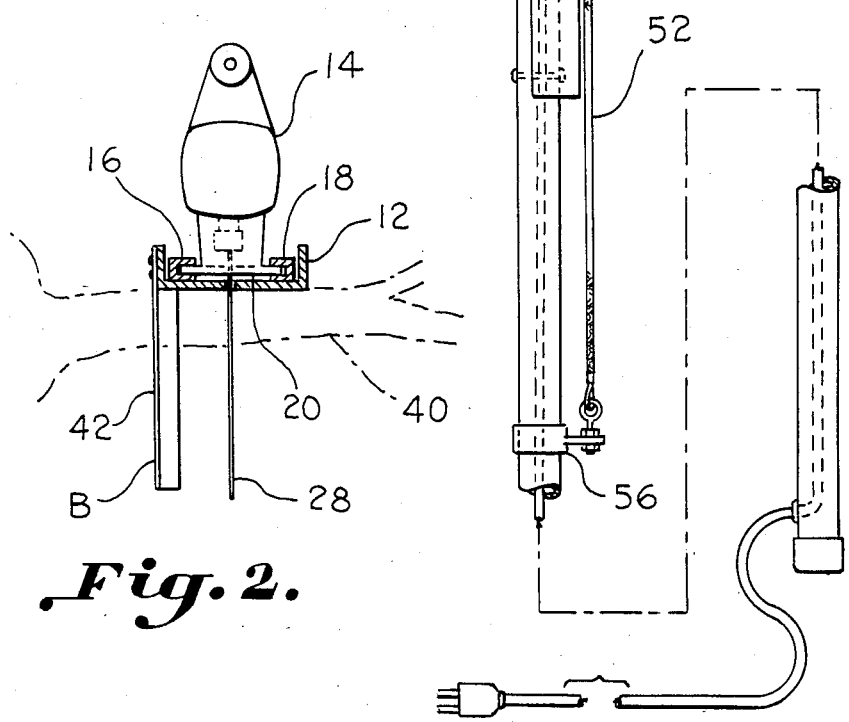
FIG. 2 is a front elevation illustrating a power tree pruning device according to the invention in a cutting position suspended on a tree limb.

The angle arm 42 makes an angle of approximately thirty degrees with the side 50 of the base means 12. If the angle arm 42 is placed over a tree limb, the acute angle between the arm and the base will hold the tree limb against the base, and thus position it rigidly with respect to the saw blade 28. As the tree limb is hooked in the tapering crevice, the saw slides up the rack so that the saw blade teeth are on top of the limb. By offsetting the plane of the angle arm and the cutting plane of the saw blade 28, the pruning device may be made to continue to be suspended from a cut stump 40a of the tree limb after the cut has been made. The pruning device must be placed so that the angle arm 42 is on the stump side of the limb, as can best be seen in FIG. 2.

Biasing means is provided by an elastic cord or other elongated biasing element which exerts a relatively constant cutting pressure on the saw teeth beyond that resulting from the weight of the saw alone. The cord 52 is attached to the saw by means of a hook 54 and to the elongated handle at the opposite end by means of a slide ring 56. By sliding the ring 56 the biasing force of the elastic cord 52 may be adjusted to apply more or less downward force on the saw.

As can best be seen in FIG. 1, the saber saw 14 is positioned on the rack 16, 18 with the saw blade 28 towards the top of the rack and with the heavier motor end down towards the pole. This minimizes the tendency of the saw blade to bind when sliding up and down on the rack. The saw blade 28 is mounted in the saw with the blade teeth down, which is the reverse of the normal blade position. When the pole is held near the vertical, the weight of the saw alone will cause it to slide down the rack to the bottom position. Lowering the pruning device over a tree limb to capture a limb in the tapering crevice of the angle arm 42 simultaneously raises the saw as the blade rides atop of the limb to be cut. The length of the saw blade is equal to or greater than the open mouth 46 of the angle arm 42 so that the blade will always be above the limb to make the cut.

When large limbs are cut, it is desirable that an initial shallow cut be made in the bottom of the limb which is opposed from where the top cut is to be made. This prevents the weight of the limb from splitting the branch before the downward cut is completed causing injury to the tree and possible dangling of the partially cut tree limb from the tree at an angle at which it is very difficult to cut.

For this purpose, the angle arm 42 includes an upward facing hook means which includes a very shallow hook portion 62 forming a shallow angle of approximately fifteen to twenty degrees with the side 50 of the base 12. This shallow hook is concave facing upwards rather than downwards. In addition, the catch 34 is provided so that the elastic cord 52 may be deformed and passed over the catch 34 in which instance, the saw is biased upwards toward the top of the rack by the tension of the elastic cord rather than downwards. This brings the saw blade approximately one inch above the junction of the upper edge of the shallow hook 62 and the base side 50.

If the saw blade 28 is now reversed, with the toothed edge facing upwards, or a double-edged blade used, the saw blade may now be firmly pushed up against a bottom of the limb as can best be seen in the dotted line illustration of FIG. 1, to form a shallow cut in the bottom of the limb. The depth of the bottom cut is limited by the relatively small amount of further upward travel of the saw in the rack and the pressure on the blade as the cut is being made is again determined by the tension in the elastic cord rather than the firmness with which the rack and arm assembly is pressed against the branch.

After this cut is made, the blade is repositioned in its reverse position, and the elastic cord 52 is released from the upper catch 34. The elastic cord then pulls downward and the angle arm B may be placed over the top of the tree limb and the through cut made.

Thus, it can be seen that a very advantageous construction can be had for a power tree pruning device in accordance with the present invention wherein the device may be suspended on a tree limb and operated from a remote position by the operator rather than from beneath the limb. After the cut is made through the limb the tree pruning device remains suspended from a cut stump of the tree limb for removal by the operator after the limb has fallen safely to the ground.

It will be understood, of course, that while the form of the invention herein shown and described constitutes a preferred embodiment of the invention, it is not intended to illustrate all possible form of the invention. It will also be understood that the words used are words of description rather than of limitation and that various changes may be made without departing from the spirit and scope of the invention herein disclosed.

What is claimed is:

1. A power tree pruning device comprising:
   an elongated pole for reaching overhead tree limbs having a first end and a second end;
   base means carried by said elongated pole adjacent said first end for slideably carrying a power saw with a blade of said power saw extending to one side of said base;
   rack means carried by said base means for carrying said power saw on said base and guiding said power saw in a one-dimensional sliding motion;
   angle arm means carried by said base means opening outwards to a mouth for receiving a tree limb and tapering from said open mouth toward said base means;
   said angle arm means tapering toward said base means to form a crevice between an edge of said angle arm and a surface of said base means in which said tree limb is gripped as said power saw blade cuts through said limb;
   said angle arm means being offset on said base means to one side of said saw blade so that a stump of said tree limb remaining after said tree limb is cut is retained in said crevice whereby said angle arm means retains said pruning device suspended from said stump after the cut tree limb falls to the ground.

2. The device of claim 1 including upward facing hook means carried by said base means having a limb engaging surface facing opposite from that of said open mouth of said angle arm means for engaging a bottom surface of a tree limb when said device is urged against said limb from underneath.

3. The device of claim 2 wherein said hook means is formed as part of said angle arm means.

4. The device of claim 2 including biasing means for urging said power saw and saw blade upwards in a vertical direction against a limb engaged by said upward facing hook means.

5. The device of claim 4 wherein said biasing means is reversible to exert a downward vertical force on said power saw and saw blade to cut downward through said limb when gripped by said angle arm means.

6. The device of claim 2 including:
an elongated deformable biasing element connected to a downward end of said power saw when said device is in a vertical position for pruning a limb overhead;
a second end of said biasing element being connected to said elongated pole adjacent said second end thereof so that said biasing element urges said power saw downwardly; and
catch means carried adjacent an upper end of said base means in said vertical position; and
said elongated biasing element being deformable to be placed over said catch means to reverse the biasing force exerted by said biasing element to exert a biasing force on said power saw in an upward vertical direction.

7. The device of claim 1 including resilient means urging said power saw toward said second end of said device thereby urging said saw blade through said tree limb during cutting.

8. The device of claim 1 including an elongated slot formed in said base means through which said saw blade extends.

9. The device of claim 8 wherein said angle arm means is offset to one side of said slot.

10. The device of claim 1 wherein said rack means includes a pair of spaced parallel track members having a vertical leg extending up from said base means and a horizontal leg extending over said base means, said power saw including a base shoe plate which is slidably received underneath the horizontal flanges of said tracks.

11. The device of claim 7 wherein said biasing means includes an elastic cord and said device includes a forward catch carried adjacent a free end of said base means over which said elastic cord may be guided to bias said power saw in a direction opposite to said normal downward biasing direction so that said biasing force on said power saw may be reversed.

12. A tree pruning device comprising:
an elongated pole having first and second ends for reaching overhead for cutting and trimming tree limbs;
a base means affixed adjacent a first end of said elongated pole;
rack means carried on said base means for slidingly carrying a power saw on said base means in a manner in which power saw slides on said base means in opposing directions relative to said base means and said pole with a blade of said power saw extending away from said base means in a plane intersecting said base means;
an elongated slot formed in said base means for receiving a blade of said saw through said base means;
angle arm means carried by said base means for gripping a tree limb; and
said angle arm means lying in a plane intersecting said base means which is offset to said plane of said saw blade; said angle arm means gripping a stump of a cut tree limb remaining on the trunk of said tree after said tree limb is pruned and for retaining said pruning device in a suspended position hanging from said stump.

13. The device of claim 12 wherein said angle arm device includes an angled edge which tapers from an open mouth toward and forming an acute angle with said base means, said tree limb being gripped between said angled edge and said base means.

14. The tree pruning device of claim 12 including an upward facing hook means formed on a top part of said angle means for bearing against an underneath portion of a tree limb which is to be cut so that said saw may be urged against said tree limb to provide an undercut in said tree limb.

15. The device of claim 12 including an elastic cord for being attached at one end to said power saw and at another end to said elongated pole for exerting a downward force on said saw and saw blade to cut through said tree limb.

16. An accessory pruning device for mounting a power saw of the type which has a reciprocating saw blade and a shoe plate through which the saw blade extends, said device comprising:
a base means;
an elongated handle having a first end at which the said base means is carried for extending said base means overhead for pruning a tree limb;
rack means for slidably receiving said shoe plate of said saw and carrying said power saw on said base means for sliding one-dimensional motion in opposing directions;
means for receiving a saw blade of said power saw through said base means so that said saw blade extends away from said base means;
means for guiding a said saw blade into engagement with said tree limb; and
means for urging said saw in a direction to cause said saw blade to cut through said tree limb for pruning.

17. The device of claim 16 wherein said means for receiving said saw blade includes an elongated slot formed in said base means facilitating extension and sliding of said saw blade along said base means.

18. The device of claim 16 wherein said means for guiding said saw blade into engagement with said tree limb includes an angled arm tapering outwardly from said base means to an open mouth for receiving said tree limb.

19. A power pruning device which may be mounted on a long pole to permit cutting overhead tree limbs with a conventional electric saber saw comprising:
an elongated base fixture which mounts rigidly to a pole;
elongated flange means carried by the base fixture;
an elongated slot in the base fixture;
said flange means sized and spaced as to fit closely over a side edge of a base shoe of said conventional saber saw constituting a track allowing a saber saw with its blade in place to freely slide in one dimension, but otherwise to be securely attached to the base fixture; and a winged extension rigidly attached to the base fixture and protruding outwardly from the base in the same direction as, and in a plane parallel to, the saw blade extending through the base fixture, and forming an acute angle downward between its inner edge and an end of the base fixture to which the pole is attached, in order to guide the placement of the base fixture over the limb to be cut so that in the placement process the saw is lifted on its track ensuring that the blade is always on the top of the limb to be cut, and in order, when finally positioned, that the entire assembly hangs securely over the limb to be cut so that the operator may now release the pole and activate the saw with a remote switch from some safe position away from where the limb will fall.

20. The device of claim 19 wherein the winged extension is placed parallel to, but sufficiently displaced from, the cutting plane of the saw blade so that the entire apparatus will continue to hang from the stub of a limb after it has been severed, provided only that the winged extension is placed towards the tree trunk from the cut.

21. The device of claim 19 including biasing means connected between the slideable saber saw and said pole to provide a downward force on the saw and thus increase the cutting pressure of the saw blade beyond that resulting simply from the weight of the saber saw alone.

22. The device of claim 21 wherein said biasing means has a sufficient force so that after placement over the limb, effective cutting may be initiated remotely from a safe position with an auxiliary electrical switch without further action or intervention except for removal after the limb is severed.

* * * * *